D. R. & T. H. CARTER.
Sawing-Machines.
No. 151,566.                                    Patented June 2, 1874.
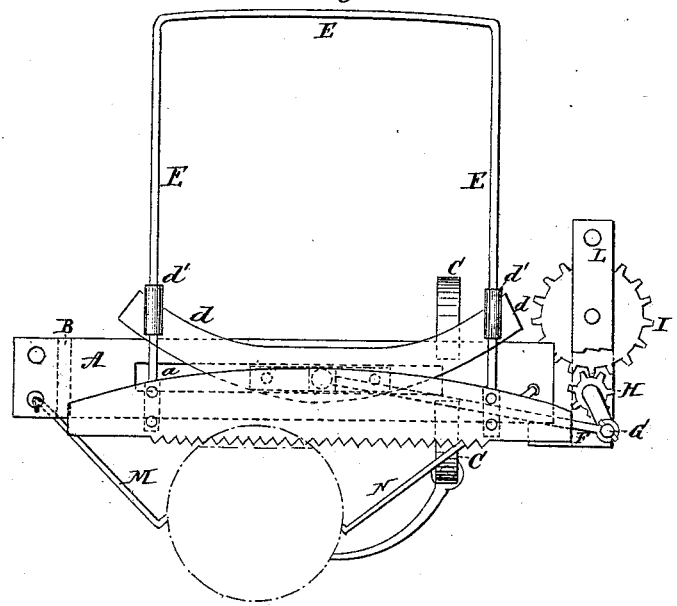
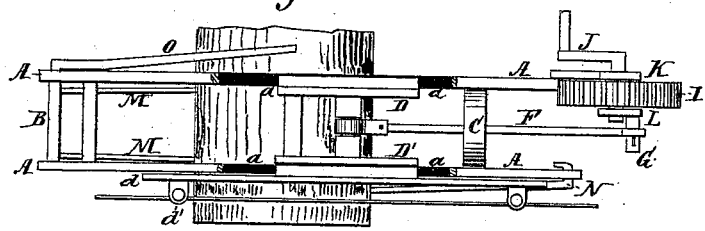
WITNESSES.                                      INVENTOR.
                                                D. R. Carter
                                                T. H. Carter
                                             BY
                                                ATTORNEYS.

UNITED STATES PATENT OFFICE.

DAVID R. CARTER, OF ROCKPORT, AND THOMAS H. CARTER, OF BREMEN, KENTUCKY.

IMPROVEMENT IN SAWING-MACHINES.

Specification forming part of Letters Patent No. 151,566, dated June 2, 1874; application filed April 10, 1874.

*To all whom it may concern:*

Be it known that we, DAVID R. CARTER, of Rockport, in the county of Ohio and State of Kentucky, and THOMAS H. CARTER, of Bremen, in the county of Muhlenburg and State of Kentucky, have invented a new and Improved Sawing-Machine; and we do hereby declare that the following is a full, clear, and exact description of the same, reference being had to the accompanying drawing forming a part of this specification, in which—

Figure 1 is a side elevation, and Fig. 2 a plan view.

The invention relates to a mechanical contrivance, whereby a crosscut-saw may be operated by hand mechanism to such advantage that one man can do the work of six, the whole device weighing about one hundred pounds, and being conveniently portable to the timber.

The invention will first be fully described in connection with all that is necessary to a full understanding thereof, and then pointed out in the claim.

A A represent two parallel plates, connected at the rear by a transverse plate, B, and at the front by the recessed yokes C C. D D' is a sliding head to move in the slots $a$ $a$ of plates A, and having the outer plate $d$ with vertical guides $d'$ $d'$. In the latter slide freely the twice bent and rectangular-sliding saw-stock E. F is the pitman that connects the slide-head D D' with the crank-shaft G of pinion H. The latter is driven by a spur-wheel, I, provided with the hand-crank J. The shafts of the wheel and pinion are journaled in the two upright plates K L. M N are grapples, and O a brace by which the machine is fastened to a log.

The operation is as follows: The frame must be placed on the top of the stock or log, and firmly secured by four dogs, two at each end of the machine, these dogs being fastened in the sides of the log, while the brace is placed at the top. By turning the drive-wheel which communicates motion to the saw in a horizontal direction the weight of the saw is sufficient to make it cut rapidly, the entire machinery being operated by one man.

One man, with this machine, can perform as much work as six men could do in the same time with three of the ordinary crosscut-saws. The drive and pitman wheel may either occupy a position one above the other or on a level with the slide, the latter position being preferable. By either enlarging the pitman-wheel or diminishing the size of the drive-wheel the saw may be given a correspondingly slower motion, and by the opposite the speed may be proportionately increased.

We desire to disclaim patent No. 119,701.

Having thus described our invention, what we claim as new is—

The combination of parallel plates A A, connected by reversed yokes C C, as well as plate B, horizontally-sliding head D, guides $d'$, and vertically-sliding saw-stock E, as set forth, and for the purpose specified.

DAVID RANDOLPH CARTER.
THOMAS HUGH CARTER.

Witnesses to D. R. CARTER:
  J. J. CARTER,
  JAMES H. DANKS.
Witnesses to T. H. CARTER:
  R. C. GRUNDY,
  WM. KOSSUTH DEMPSY.